May 25, 1965   L. A. CARLTON ETAL   3,185,997
PIPE COLLAR LOCATOR
Filed July 1, 1963   2 Sheets-Sheet 1
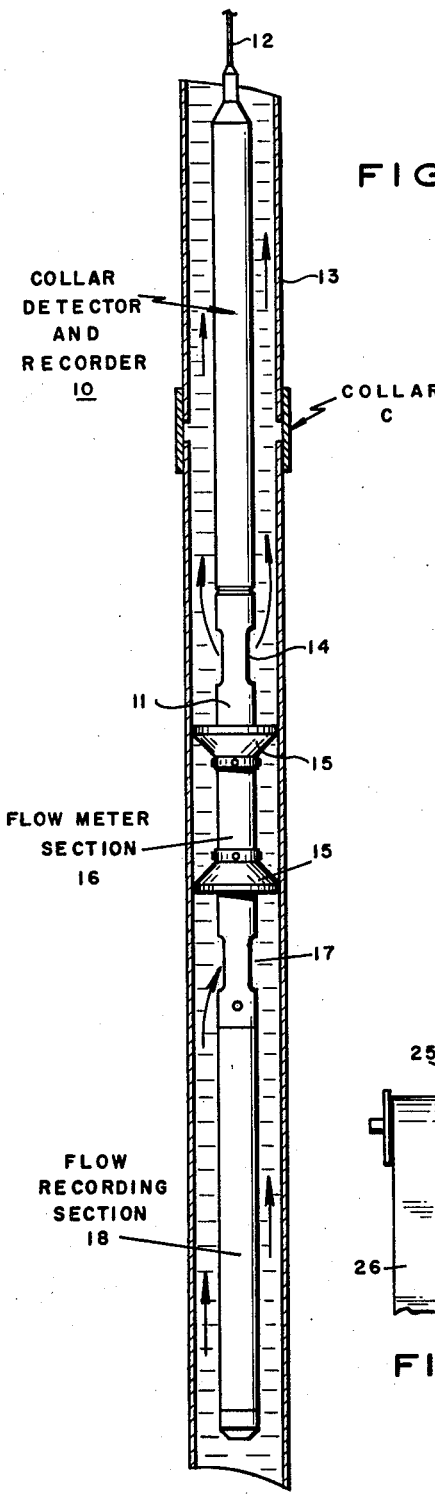
FIG. 1.
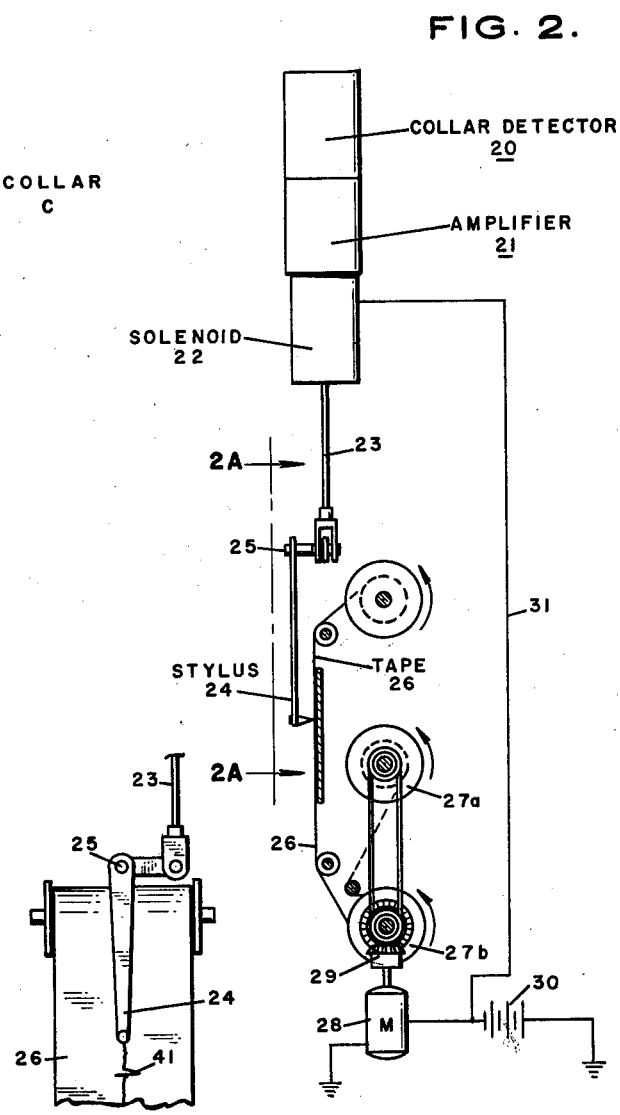
FIG. 2.
FIG. 2A.
INVENTORS.
LOUIS A. CARLTON,
AARON E. PIERCE,
BY John S. Schneider
ATTORNEY May 25, 1965
L. A. CARLTON ETAL
3,185,997
PIPE COLLAR LOCATOR
Filed July 1, 1963
2 Sheets-Sheet 2
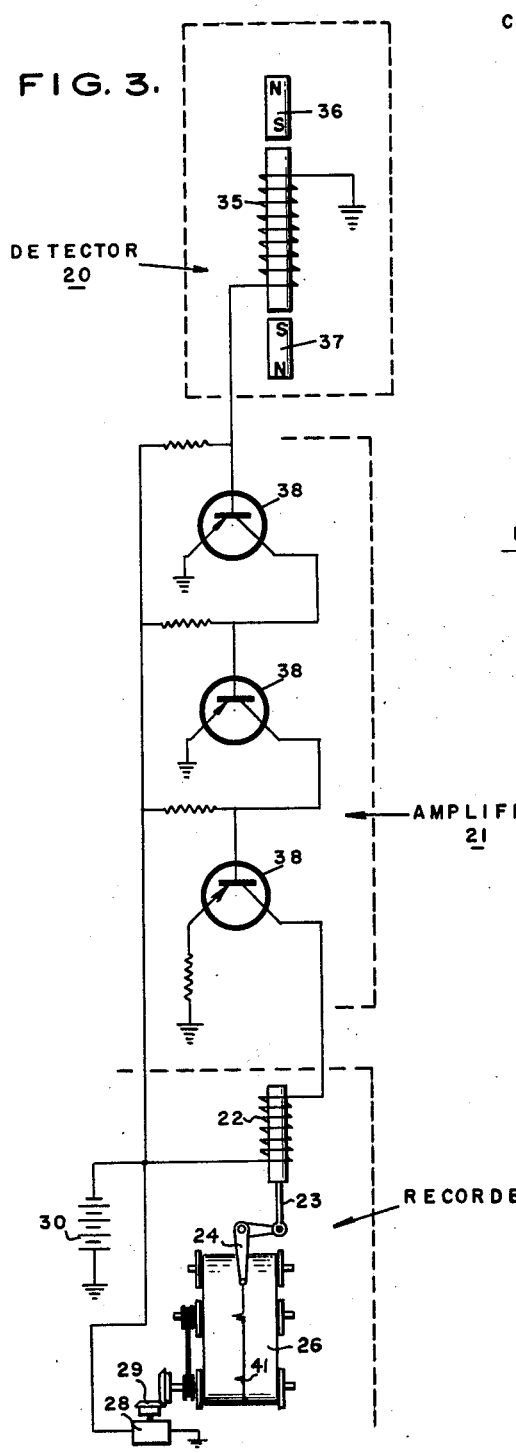
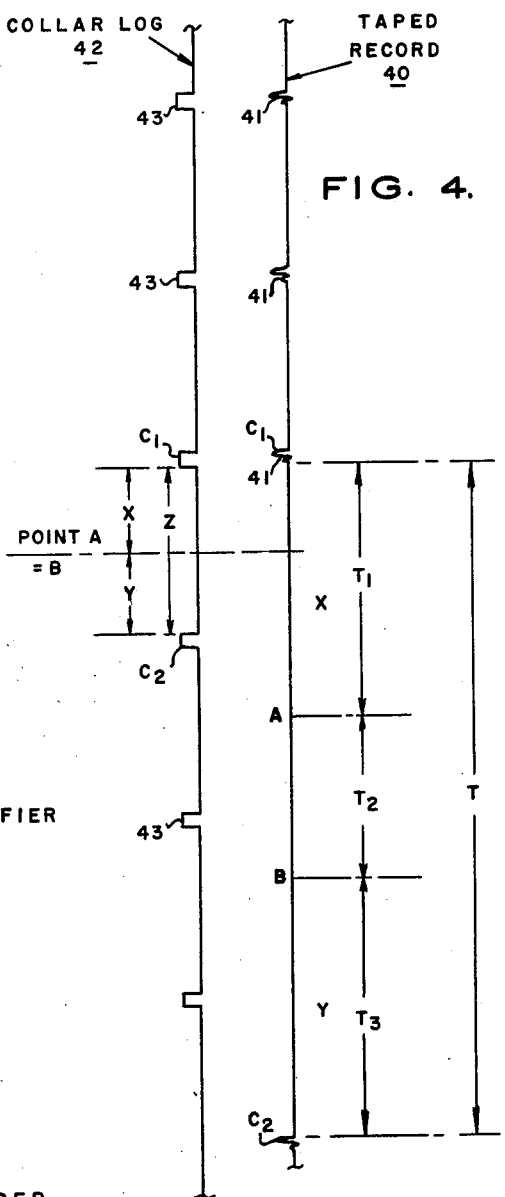
INVENTORS.
LOUIS A. CARLTON,
AARON E. PIERCE,
BY John A. Schneider
ATTORNEY.

United States Patent Office 3,185,997
Patented May 25, 1965

3,185,997
PIPE COLLAR LOCATOR
Louis A. Carlton, Houston, and Aaron E. Pierce, Humble, Tex., assignors, by mesne assignments, to Esso Production Research Company
Filed July 1, 1963, Ser. No. 291,860
1 Claim. (Cl. 346—33)

The present invention concerns a subsurface recording wire line collar locator especially adaptable for use with other subsurface recording logging instruments such as flowmeters and thermometers.

When conducting surveys in wells with logging instruments suspended on solid wire lines, the accuracy of the depth readings of the odometer attached to the wire line at the surface is affected by several factors such as wire line stretch, instrument weight, well fluid density, and well fluid flow rate so that the true depth of the instrument at any particular time is not known. In some wells the error in the odometer depth reading is as much as 6 to 8 ft. Knowledge of the exact depth of the instrument is important especially in wells which have two or more closely spaced zones open to fluid production or injection.

The present invention provides a solution to the problem of obtaining accurate information as to the depth location of instruments run in the well on solid non-conductor type wire lines.

The subsurface recording self-contained collar locator of the invention may be run in the well alone, or as is preferred, in tandem with other wire line self-contained instruments on small diameter solid wire lines in order to improve accuracy of the depth control for either the collar locator itself or the wire line instrument run with it. The collar locator detects and records collars as a function of time, and by simple calculations using data obtained from the collar locator, along with depths taken from an existing collar log made at the time the well is perforated, the actual depth of the instrument is obtained.

Thus, a primary object of the present invention is to provide an improved wire line device for obtaining more accurate depth measurements.

Briefly, the apparatus of the invention comprises a pipe collar sensing means adapted to generate signals when passing the pipe collars of a pipe string in which the apparatus is suspended; a recording tape for recording said signals; means for recording the occurrences of said signals on said recording tape; and circuit means for transmitting the signals from the sensing means to the recording means. The circuit means includes signal amplifying means for increasing signal power. The sensing means, or detector, is essentially an electric generator which consists of a coil and magnet assembly. When the magnetic field changes as a result of moving the assembly past a pipe joint, a voltage is induced in the coil. This induced voltage or signal is fed into a D.C. amplifier and the amplified output signal is then used to actuate a solenoid attached to a stylus assembly which scribes on the plastic tape which is fed past the stylus at a constant speed.

The above object and other objects and advantages of the invention will become apparent from a more detailed description of the invention when taken with the drawings wherein:

FIG. 1 is a vertical view, partly in section, showing both the collar locator of the invention and a wire line subsurface recording flowmeter suspended by a solid wire line in a well pipe;

FIG. 2 is an elevational view of the subsurface recording collar locator;

FIG. 2A is a fragmentary view taken along the line 2A—2A of FIG. 2;

FIG. 3 is a schematic view of the collar locator showing its elements and circuitry; and FIG. 4 is a view of representative logs with designations to aid in describing the manner of handling the data in order to obtain accurate depth measurements.

In FIG. 1 is shown a collar detector and recorder 10 connected in tandem to a flowmeter 11 and suspended on a solid non-conductor type wire line 12 in a well pipe string 13. Flowmeter 11 may be of the type shown and described in application Serial No. 145,094, entitled "Subsurface Flowmeter," filed October 16, 1961, by B. A. Peters, E. Rich, and L. A. Carlton, which includes fluid flow outlets 14, flow diverters 15, a flowmeter section 16, fluid flow inlets 17, and a self-contained flow recording section 18.

Collar locator 10 is shown in detail in FIGS. 2 and 2A and it includes a detector or collar sensing device 20, an amplifier 21, a solenoid 22, a solenoid plunger 23 connected to a scribe or stylus 24 which is arranged to pivot at a point 25, a recording tape 26 wound on spools 27a, b which are driven through gears 29 by a motor 28 powered by a battery 30. Spool 27b is connected to the capstan drive to permit slippage so that tape 26 will run at constant speed. Battery 30, through a lead 31, also supplies power to solenoid 22.

FIG. 3 shows the components of detector 20 and amplifier section 21 in more detail. Detector 20 includes a coil of wire 35 biased by permanent magnets 36 and 37 arranged at its ends. Amplifier section 21 preferably includes three series transistor amplifiers 38 arranged as shown.

When in operation, referred particularly to FIGS. 1 to 3, collar locator 10 connected to flowmeter 11 is run in pipe string 13 suspended by wire line 12 with tape 26 traveling on spools 27a, a at a constant speed; e.g., 2 in./min. An electrical signal is generated when the magnetic bias in detector 20 is disturbed as it passes collar C in pipe string 13. This signal is then fed through amplifier 21 to increase the power of the signal to solenoid 22 to cause solenoid plunger 23 to move upwardly and move stylus 24 to form a mark or pip 41 representative of collar C on tape 26. At a desired depth for taking flow measurements, lowering of the pipe locator is halted. Flow measurements are made and then the pipe locator is further lowered. The speed of lowering before and after the stop is constant, at least near the stop point.

A representative tape record 40 is seen in FIG. 4. The various pips 41 represent pipe collars. A conventional collar log 42 with the pipe collars designated 43 is also shown in this figure.

The following calculations illustrate the manner of accurately locating point A, B the place at which the collar locator was stopped.

Let:

$T_1$ = time elapse between $C_1$ and A
$T_2$ = time elapse between A and B (stop time)
$T_3$ = time elapse between B and $C_2$
$T$ = total time = $T_1 + T_2 + T_3$
$S_1$ = constant collar locator speed (ft./min.) at time $T_1$
$S_2$ = constant collar locator speed (ft./min.) at time $T_3$ $S_1$ can be obtained directly from the odometer reading in ft./min. or it can be obtained from information on tape 26 together wtih information given by collar log 42. In the latter instance the actual distance between any two selected collars (marks 43) in ft. is obtained from log 42 and the time required for the instrument to pass between the two collars is found by dividing the speed of tape 26 into the distance measured on the tape between the same two collar designations (pips 41). Then $S_1$ equals the distance between the collars divided by the time required to pass between the collars. $S_2$ can be obtained in the same manner as $S_1$, although $S_2$ is made at a different, preferably lesser, speed than $S_1$. For example, $S_1$ may be 100 ft./min. and $S_2$ may be 90 ft./min.

$X$=distance the stop point A, B is below collar $C_1$
$Y$=distance the stop point A, B is above collar $C_2$
$T=T_1+T_2+T_3$
$T_1S_1+T_3S_2$=distance between collar $C_1$ and $C_2=Z$ $T_2$ is determined at the surface.

T is determined by measuring the distance between pips $C_1$ and $C_2$ on tape 26 and dividing this distance by the tape speed; e.g., 1 in.÷2 in./min.=0.5 min.

Z is obtained from pipe collar log 42; as $X+Y$=distance between collar $C_1$ and $C_2=Z$
$X=S_1T_1$ and $Y=S_2T_3$ It is desired to find $T_1$, $T_3$, X and Y.

$$T_3=T-T_1-T_2$$

$$T_1S_1+(T-T_1-T_2)S_2=Z$$

$$T_1S_1-T_1S_2=Z-TS_2+T_2S_2$$

$$T_1=\frac{Z-TS_2+T_2S_2}{(S_1-S_2)}$$

Then, $$X=S_1\left(\frac{Z-TS_2+T_2S_2}{S_1-S_2}\right)$$

The distance X is the actual distance the instrument is positioned below collar $C_1$ at the stop point and this distance is used to correct the odometer readings at the surface for this stop point and any other stop points made by the collar locator. Thus, assuming for purposes of illustration that the odometer reading at the stop point A, B is 5,315 ft., the depth of collar $C_1$ is 5,290 ft., and X is 15 ft. The correction factor for the odometer reading is 5,315 minus 5,305 (5,290+15)=10 ft. The 10 ft. correction factor is substracted from the odometer reading for each stop made with the instrument to arrive at the true depth of the collar locator.

A flowmeter has been used with the collar locator only for purposes of illustration. The collar locator is useful with any wire line subsurface recording instrument such as a subsurface thermometer where knowledge of the position of the instrument in the well is needed with great accuracy.

Having fully described the nature, operation, apparatus and objects of our invention, we claim:

A self-contained, subsurface recording collar locator adapted to be suspended in a well pipe on a wire line comprising:

a pipe collar sensing means including a coil of wire biased by permanent magnets adapted to generate signals when passing the pipe collars of said pipe string in which said pipe collar locator is suspended;

means for amplifying said signals;

a movable, constant speed recording tape for recording said amplified signals;

a movable stylus adapted to record the occurrence of said signals on said recording tape;

signal-responsive means connected to said sytlus adapted to move said stylus to record said signals;

means for transmitting said signals to said signal-responsive means; and means for driving said tape at constant speed whereby when said collar locator is lowered in said well pipe at a constant speed past at least two pipe collars next to and above a selected stop point and stopped at said selected stop point and then further lowered in said well pipe at a constant speed past at least two pipe collars next to and below said selected stop point, an accurate depth of said collar locator at said stop point is obtainable by determining the distance said stop point is below the pipe collar next to and above said stop point from the rates of speed of lowering said instrument, the distance between the two pipe collars next to and above and below said stop point, the total time taken for the instrument to travel between said two pipe collars and the stop point, and then adding such distance to the depth of the collar next to and above the stop point.

References Cited by the Examiner

UNITED STATES PATENTS

| | | | |
|---|---|---|---|
| 1,065,501 | 6/13 | Bishop | 346—1 |
| 1,838,389 | 12/31 | Goldberg | 346—1 |
| 1,955,855 | 4/34 | Marx | 73—300 |
| 2,250,703 | 7/41 | Crites et al. | 324—8 |
| 2,265,098 | 12/41 | Bettis | 73—300 |
| 2,359,894 | 10/44 | Brown et al. | 324—8 |
| 2,401,280 | 5/46 | Walstrom | 324—8 |
| 2,479,518 | 8/49 | Scherbatskoy | 346—33 |
| 2,488,491 | 11/49 | Davis | 346—33 |
| 2,543,532 | 2/51 | Neufeld | 346—33 |
| 2,558,427 | 6/51 | Fagan | 73—151 |
| 2,580,544 | 1/52 | Herzog | 250—83.6 |
| 2,664,542 | 12/53 | Lynn | 324—8 |
| 2,707,768 | 5/55 | Owen | 324—1 |
| 2,782,365 | 2/57 | Castel | 324—34 |
| 2,814,019 | 11/57 | Bender | 73—151 |
| 2,853,788 | 9/58 | Kinley | 33—178 |
| 2,879,126 | 3/59 | James | 346—74 |
| 2,888,309 | 5/59 | Tanguy | 346—33 |
| 3,020,354 | 2/62 | McGowen | 179—100.2 |
| 3,035,479 | 5/62 | Baltosser et al. | 88—14 |
| 3,060,315 | 10/62 | Scherbatskoy | 250—83.3 |
| 3,065,406 | 11/62 | Mayes | 324—1 |
| 3,088,068 | 4/63 | Hall et al. | 324—34 |

LEYLAND M. MARTIN, *Primary Examiner.*